(12) United States Patent
Peard

(10) Patent No.: US 10,724,708 B2
(45) Date of Patent: Jul. 28, 2020

(54) SPOTLIGHT COMPRISING A SUPPORT AND AT LEAST ONE LIGHT MODULE TO PRODUCE A LIGHT BEAM AND A LIGHT DEVICE COMPRISING SAID SPOTLIGHT

(71) Applicant: AYRTON, Longjumeau (FR)

(72) Inventor: Yvan Peard, Antony (FR)

(73) Assignee: AYRTON, Longjumeau (FR)

( * ) Notice: Subject to any disclaimer, the term of this patent is extended or adjusted under 35 U.S.C. 154(b) by 0 days.

(21) Appl. No.: 16/089,295

(22) PCT Filed: Mar. 31, 2017

(86) PCT No.: PCT/FR2017/050748
§ 371 (c)(1),
(2) Date: Sep. 27, 2018

(87) PCT Pub. No.: WO2017/174902
PCT Pub. Date: Oct. 12, 2017

(65) Prior Publication Data
US 2019/0093859 A1    Mar. 28, 2019

(30) Foreign Application Priority Data
Apr. 4, 2016 (FR) ...................... 16 52944

(51) Int. Cl.
*F21V 14/02* (2006.01)
*F21V 8/00* (2006.01)
(Continued)

(52) U.S. Cl.
CPC .............. *F21V 14/02* (2013.01); *F21V 5/007* (2013.01); *F21V 5/04* (2013.01); *F21V 14/06* (2013.01); *G02B 3/0056* (2013.01); *G02B 6/0006* (2013.01); *G02B 6/0008* (2013.01); *G02B 19/0066* (2013.01); *F21S 2/00* (2013.01);
(Continued)

(58) Field of Classification Search
CPC ... G02B 19/0066; G02B 3/0056; F21V 5/007; F21V 29/50; F21V 21/30; F21V 13/02; F21S 10/02; F21S 2/00
See application file for complete search history.

(56) References Cited

U.S. PATENT DOCUMENTS 1,670,682 A    5/1928  Halvorson, Jr. et al.
4,319,311 A    3/1982  Mitchell
(Continued)

FOREIGN PATENT DOCUMENTS

CN    201180949 Y    1/2009
CN    102713425 A    10/2012
(Continued)

OTHER PUBLICATIONS

Translation of written opinion (Year: 2018).*
(Continued)

*Primary Examiner* — Tracie Y Green
(74) *Attorney, Agent, or Firm* — Jenkins, Wilson, Taylor & Hunt, P.A.

(57) ABSTRACT

The present invention relates to a spotlight adapted for a light device, said spotlight comprising a support and at least one light module adapted for producing a light beam and comprising at least one light source, such as a light-emitting diode (LED) and an optical element, such as a lens.

16 Claims, 17 Drawing Sheets

(51) Int. Cl.
*F21V 5/04* (2006.01)
*F21V 14/06* (2006.01)
*F21V 5/00* (2018.01)
*G02B 3/00* (2006.01)
*G02B 19/00* (2006.01)
*F21W 131/406* (2006.01)
*F21Y 105/16* (2016.01)
*F21Y 115/10* (2016.01)
*F21V 21/30* (2006.01)
*F21V 13/02* (2006.01)
*F21S 2/00* (2016.01)
*F21V 29/50* (2015.01)
*F21S 10/02* (2006.01)

(52) U.S. Cl.
CPC ............... *F21S 10/02* (2013.01); *F21V 13/02* (2013.01); *F21V 21/30* (2013.01); *F21V 29/50* (2015.01); *F21W 2131/406* (2013.01); *F21Y 2105/16* (2016.08); *F21Y 2115/10* (2016.08)

(56) References Cited

U.S. PATENT DOCUMENTS

| | | | |
|---|---|---|---|
| 6,120,164 | A | 9/2000 | Libin et al. |
| 7,458,700 | B2 | 12/2008 | Gordin |
| 7,614,766 | B2 | 11/2009 | Wang et al. |
| 8,979,304 | B2 | 3/2015 | Mart et al. |
| 10,018,338 | B2 | 7/2018 | Jurik et al. |
| 10,349,490 | B2 | 7/2019 | Sato |
| 10,533,734 | B2 | 1/2020 | Jiang |
| 2003/0137840 | A1 | 7/2003 | Citron et al. |
| 2004/0062040 | A1 | 4/2004 | Blume et al. |
| 2005/0281029 | A1 | 12/2005 | Inamoto |
| 2006/0165385 | A1 | 7/2006 | Aoki |
| 2008/0002413 | A1 | 1/2008 | Wang et al. |
| 2008/0068839 | A1 | 3/2008 | Matheson |
| 2009/0225542 | A1 | 9/2009 | Belliveau et al. |
| 2009/0237924 | A1 | 9/2009 | Ladewig |
| 2010/0110671 | A1 | 5/2010 | Gordin et al. |
| 2010/0188018 | A1 | 7/2010 | Salm |
| 2010/0214782 | A1 | 8/2010 | Allegri |
| 2011/0110090 | A1 | 5/2011 | Jurik |
| 2011/0261568 | A1 | 10/2011 | Dalsgaard |
| 2012/0092863 | A1 | 4/2012 | Krijn et al. |
| 2012/0127710 | A1 | 5/2012 | Jurik et al. |
| 2012/0257400 | A1* | 10/2012 | Shibata ............... B60Q 1/076 362/460 |
| 2012/0307486 | A1 | 12/2012 | Gordin et al. |
| 2014/0029259 | A1 | 1/2014 | Auyeung |
| 2014/0301071 | A1 | 10/2014 | Jørgensen et al. |
| 2014/0301078 | A1 | 10/2014 | Gordin et al. |
| 2014/0321135 | A1 | 10/2014 | Chen et al. |
| 2015/0016106 | A1 | 1/2015 | Belliveau et al. |
| 2015/0062902 | A1 | 3/2015 | Velazquez |
| 2015/0192274 | A1 | 7/2015 | Kubis et al. |
| 2016/0298829 | A1 | 10/2016 | Jurik et al. |
| 2016/0307496 | A1 | 10/2016 | Kubis et al. |
| 2018/0112858 | A1 | 4/2018 | Bowden et al. |
| 2018/0180256 | A1* | 6/2018 | Mao ..................... G02B 26/005 |
| 2018/0356081 | A1 | 12/2018 | Jiang |
| 2019/0093860 | A1* | 3/2019 | Peard ..................... F21V 5/007 |
| 2019/0107262 | A1* | 4/2019 | Peard ..................... F21S 2/00 |
| 2019/0120468 | A1* | 4/2019 | Peard ..................... F21V 14/02 |
| 2019/0186721 | A1 | 6/2019 | Jurik et al. |
| 2019/0361395 | A1* | 11/2019 | Kurashige ............. F21V 14/02 |

FOREIGN PATENT DOCUMENTS

| | | | |
|---|---|---|---|
| CN | 203115665 | U | 8/2013 |
| CN | 104566172 | A | 4/2015 |
| CN | 204328860 | U | 5/2015 |
| CN | 204345517 | U | 5/2015 |
| CN | 204534423 | A | 8/2015 |
| CN | 104930452 | A | 9/2015 |
| CN | 105716033 | A | 6/2016 |
| DE | 10 2004 023 358 | B1 | 4/2006 |
| EP | 2 196 724 | A2 | 6/2010 |
| EP | 2843303 | A1 | 3/2015 |
| FR | 2 873 785 | A1 | 2/2006 |
| FR | 2 981 432 | A1 | 4/2013 |
| FR | 2 988 464 | A1 | 9/2013 |
| WO | WO 2010/010490 | A1 | 1/2010 |
| WO | WO 2015/022644 | A1 | 2/2015 |
| WO | WO 2015/048971 | A1 | 4/2015 |
| WO | WO 2015/077384 | A1 | 5/2015 |
| WO | WO 2017/166728 | A1 | 10/2017 |
| WO | WO 2017/174903 | A1 | 10/2017 |
| WO | WO 2017/174905 | A1 | 10/2017 |
| WO | WO 2017/191386 | A1 | 11/2017 |

OTHER PUBLICATIONS

International Search Report for International Application No. PCT/FR2017/050748 (dated Jun. 21, 2017).
Non-Final Office Action for U.S. Appl. No. 16/089,969 (dated Jun. 27, 2019).
Non-Final Office Action for U.S. Appl. No. 16/089,300 (dated Jun. 20, 2019).
Commonly-assigned, co-pending U.S. Appl. No. 16/088,808 for "Light Device Comprising a Spotlight Equipped With a Support and With At Least One Light Module, Assembly of at Least Two Light Devices and Method of Use of the Assembly," (Unpublished, filed Sep. 26, 2018).
Commonly-assigned, co-pending U.S. Appl. No. 16/089,969 for "Spotlight Adapted for a Light Device Comprising Light Modules and a Light Device Comprising Said Spotlight," (Unpublished, filed Sep. 28, 2018).
Commonly-assigned, co-pending U.S. Appl. No. 16/089,300 for "Spotlight Adapted for a Light Device Comprising at Least One Light Module With an Adjustable Position and a Light Device Comprising Said Spotlight," (Unpublished, filed Sep. 27, 2018).
Notification of Transmittal of the International Search Report and the Written Opinion of the International Searching Authority, or the Declaration for International Application No. PCT/FR2017/050746 (dated Jun. 21, 2017).
Notification of Transmittal of the International Search Report and the Written Opinion of the International Searching Authority, or the Declaration for International Application No. PCT/FR2017/050749 (dated Jun. 21, 2017).
Notification of Transmittal of the International Search Report and the Written Opinion of the International Searching Authority, or the Declaration for International Application No. PCT/FR2017/050754 (dated Jun. 21, 2017).
Restriction and/or Election Requirement for U.S. Appl. No. 16/088,808 (dated Sep. 24, 2019).
Notice of Allowance and Fee(s) Due for U.S. Appl. No. 16/089,300 (dated Jan. 2, 2020).
Co-pending Continuation U.S. Appl. No. 16/730,160 for "Multi-Lamp Stage Light," (Unpublished, filed Dec. 30, 2019).
Commonly-assigned, co-pending Continuation U.S. Appl. No. 16/728,170 for "Spotlight Adapted for a Light Device Comprising Light Modules and a Light Device Comprising Said Spotlight," (Unpublished, filed Dec. 27, 2019).
Non-Final Office Action for U.S. Appl. No. 16/088,808 (dated Dec. 27, 2019).
Notice of Allowance and Fee(s) Due for U.S. Appl. No. 16/107,330 (dated Sep. 26, 2019).
Final Office Action for U.S. Appl. No. 16/107,330 (dated Aug. 13, 2019).
Non-Final Office Action for U.S. Appl. No. 16/107,330 (dated Apr. 1, 2019).
International Search Report for International Application Serial No. PCT/CN2016/098243 (dated Nov. 16, 2016).

* cited by examiner

SPOTLIGHT COMPRISING A SUPPORT AND AT LEAST ONE LIGHT MODULE TO PRODUCE A LIGHT BEAM AND A LIGHT DEVICE COMPRISING SAID SPOTLIGHT

FIELD OF INVENTION

The present invention relates to a spotlight adapted for a light device, said spotlight comprising a support and at least one light module adapted for producing a light beam and comprising at least one light source, such as a light-emitting diode (LED) and an optical element, such as a lens.

STATE OF THE ART

Spotlights adapted for a light device are already known in the state of the art. As a general rule, a light device comprises a base and a spotlight forming an element articulated or pivoting in relation to said base. The base is used, for example, to fix the light devices on a support surface such as a wall, a ceiling or also a structure, adapted to enable said light devices to be visible, but also to light a space around said light devices. The spotlight comprises multiple light sources capable of emitting light beams.

If the light device is installed using the base, the spotlight can pivot in relation to this base in order to adjust the position of said spotlight in relation to said base and thereby determine the direction in which the light beams are emitted.

In the field of show business, and more particularly plays and musicals, use of light devices represents a substantial part of the décor, thereby making it possible to generate particular light effects. Light devices are used to supplement the visual image offered to the spectators. During normal use of these light devices, it is possible to materialise the light beams thanks to a "mist" type smoke. This mist forms the medium on which the various light beams are rendered visible to the spectators.

In the field of show business, there is a constant need to improve existing systems and provide users with greater freedom to manipulate spotlights in order to create innovative special effects.

The object of the present invention consists in proposing a spotlight and a light device comprising said spotlight, wherein said spotlight comprises a support and at least one light module adapted for producing a light beam and comprising at least one light source, such as a light-emitting diode (LED) and an optical element, such as a lens, the spotlight being characterised in that the optical element is essentially square-shaped, preferably square-shaped.

A first advantage of this characteristic lies in the fact that the spotlight comprises, on its front face, i.e. on the face comprising the optical element and the light source adapted for producing a light beam, an optical element which is essentially square-shaped, preferably square-shaped. The spotlight support comprising at least one light module can be adapted so that the assembly composed of the support and of the light module is essentially square-shaped, preferably square-shaped. In other words, if the spotlight is used in combination with other spotlights of the same type, the multiple spotlights are capable of forming together a surface comprising said multiple spotlights and which is essentially rectangular-shaped.

Each spotlight can comprise multiple light modules, each light module having an optical element essentially presenting a square shape, preferably a square shape. In other words, each spotlight can present a front face adapted for diffusing light beams and which are essentially rectangular-shaped, preferably rectangular-shaped.

According to the invention, the various light modules in a spotlight can be positioned in the spotlight in order to form a grid. Use of optical elements which are essentially square-shaped, preferably square-shaped, makes it possible to obtain a spotlight comprising a front face on which the various optical elements are positioned in proximity to each other with minimal space between them. The assembly comprising said optical elements offers a rectangular optical surface. The minimal space between the various adjacent optical elements enables the spotlight to present an optical surface which is in the shape of a rectangular screen.

The option of positioning such optical elements in proximity to each other presents a major difference with regard to the light device disclosed in the prior art. Indeed, the light device according to the state of the art comprises adjacent optical elements each presenting an essentially circular shape, which causes the presence of a relatively large unused surface between said adjacent optical elements.

More particularly, the spotlight comprises multiple light modules, said light modules being positioned beside each other to form together a grid comprising at least one row and at least one column, preferably to form together a rectangle.

More particularly, the light modules are positioned in a grid shape comprising the same number of rows and the same number of columns.

More particularly, the light source and optical element are adapted for being positioned in extension of each other along an optical axis, the spotlight comprising adjustment means for adjusting the relative position of the light source and of the optical element so as to modify the shape of the light beam.

More particularly, the adjustment means are adapted for adjusting the distance between the light source and the optical element along the direction of said optical axis.

More particularly, the adjustment means are adapted for adjusting the relative position of the light source and of the optical element perpendicularly to that of said optical axis.

More particularly, the spotlight comprises a first part comprising said at least one optical element and a second part comprising said at least one light source, said adjustment means being adapted for adjusting the distance between the first part and the second part of the spotlight.

More particularly, the first part is adapted for, at least partially, enclosing the second part and enabling said second part to move inside the first part.

More particularly, the first part forms the exterior wall of the spotlight.

More particularly, the first part comprises, on the exterior thereof, connection means for connecting the spotlight to a support.

A second object of the invention relates to a light device comprising a spotlight and a base adapted for fixing said light device on a support surface.

More particularly, the spotlight is connected to the base along a first rotation axis to enable rotation of said spotlight in relation to the base around said first rotation axis.

More particularly, the first rotation axis is adapted to enable unlimited rotation of the spotlight in relation to the base.

More particularly, the spotlight is connected to a bracket, said bracket being connected to the base along the first rotation axis.

More particularly, the spotlight is connected to the bracket along a second rotation axis.

More particularly, the second rotation axis is adapted to enable unlimited rotation of the spotlight in relation to the bracket.

BRIEF DESCRIPTION OF DRAWINGS

The aim, object and characteristics of the invention will appear more clearly upon reading the description below drawn up with reference to the figures wherein:

FIG. 1 represents a light device 50 according to a first embodiment of the invention. The light device 50 comprises a spotlight 1 fixed on a bracket 2 with connection means so that said spotlight 1 can pivot in relation to said bracket 2 around a rotation axis 51. According to the invention, the spotlight 1 is adapted for pivoting, in an unlimited manner, around the rotation axis 51, from 0° to 360° and beyond. In other words, the connection means between the spotlight 1 and the bracket 2 are adapted to enable transfer of electrical energy and electrical signals from said bracket 2 toward the spotlight 1 thanks to a rotary contact. The rotation of the spotlight 1 in relation to the bracket 2 takes place without the rotary contact limiting the rotation of said spotlight 1 in relation to said bracket 2.

The bracket 2 is connected to a base 3 with connection means. The connection of the bracket 2 on the base 3 is adapted and enables rotation of said bracket 2 in relation to said base 3 around a rotation axis 52. According to the invention, the bracket 2 can pivot in an unlimited manner in relation to the base 3 around the rotation axis 52 from 0° to 360° and beyond. The connection means between the bracket 2 and the base 3 are adapted to enable transfer of electrical energy and electrical signals from the base 3 toward the bracket 2 thanks to a rotary contact. Hence the rotary contact does not limit rotation of the bracket 2 in relation to the base 3.

The base 3 of the light device 50 is adapted for fixing said light device 50 on a support surface, such as a wall, a ceiling or any other adapted support structure.

Figure 1:
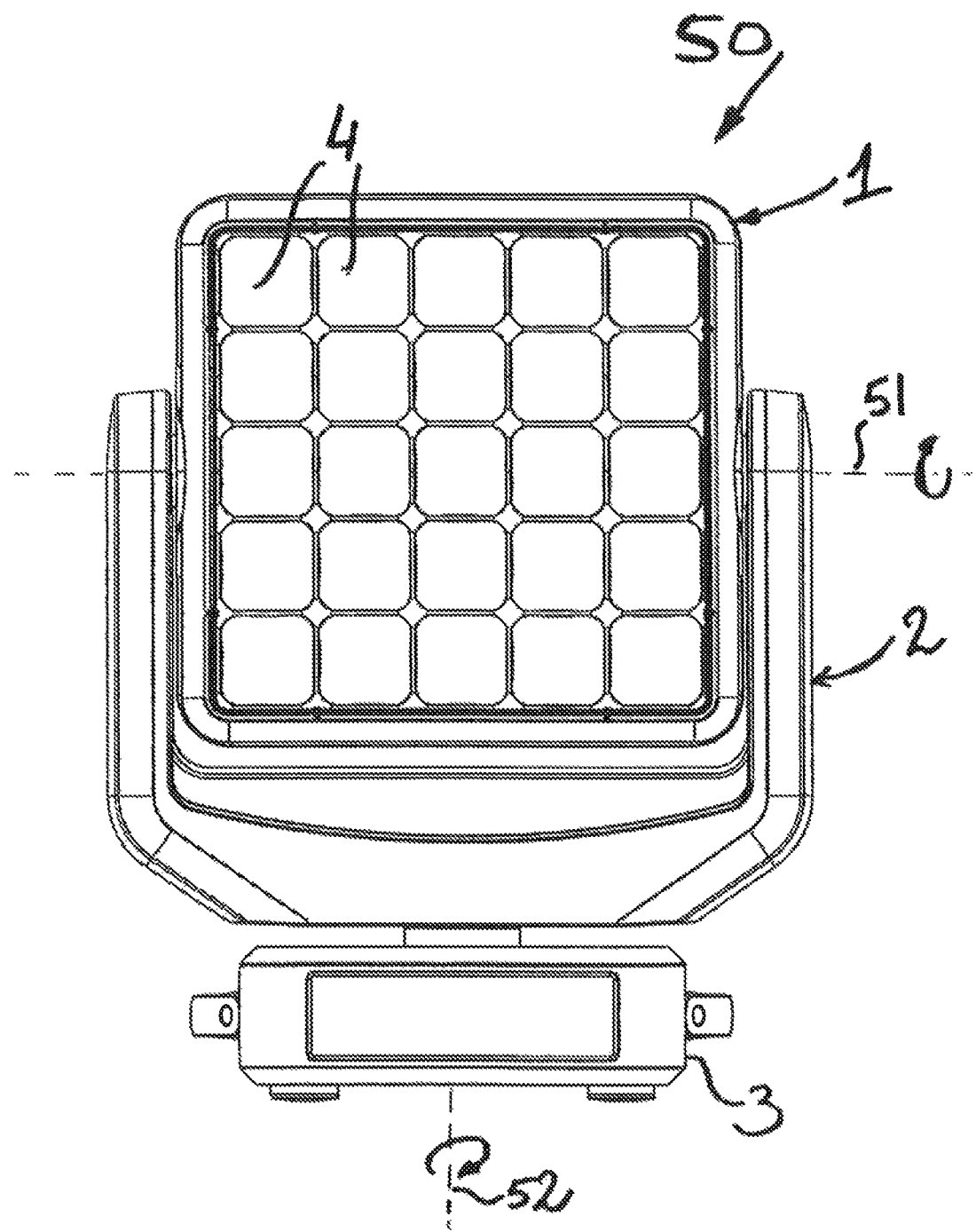
FIG. 1 represents a first embodiment of a light device according to the invention comprising a panel-shaped spotlight, said spotlight being connected to a base with the aid of a bracket, the spotlight comprising square-shaped optical elements.

During normal use of the light device 50 according to FIG. 1, the spotlight 1 is adapted for pivoting in relation to the base 3 around the first rotation axis 51 and around the second rotation axis 52. The combination of these rotations makes it possible to obtain light effects.

The spotlight 1 according to the first embodiment represented in FIG. 1, is presented essentially in a panel shape. The shape of said spotlight 1 is shown in FIGS. 1, 2, 3 and 4. The spotlight 1 comprises a set quantity of light modules. The various components and the use of such light modules are described in detail in FIGS. 9 to 18. Said light modules are equipped with at least one light source, such as a light-emitting diode (LED), and at least one optical element 4 such as a lens. The lenses 4 in the light device of the spotlight 1 are visible in FIG. 1 and represented essentially in a square shape, preferably in a square shape. The detailed representation of a lens 4 is visible in FIGS. 8a and 8b.

According to the embodiment represented in FIG. 1, the spotlight 1 comprises 25 light modules comprising lenses 4. As the lenses 4 are essentially square-shaped, the light modules of the spotlight 1 form together an optical surface covering practically the whole of the front face of said spotlight 1. Thus, the space between the various lenses 4 is relatively restricted. The lenses 4 of the light modules of the spotlight 1 can form an optical surface presenting a screen shape in order to create special light effects. The light effects which can be thus obtained thanks to the shape of the lenses 4 are detailed in FIGS. 9 to 11.

Figure 2:
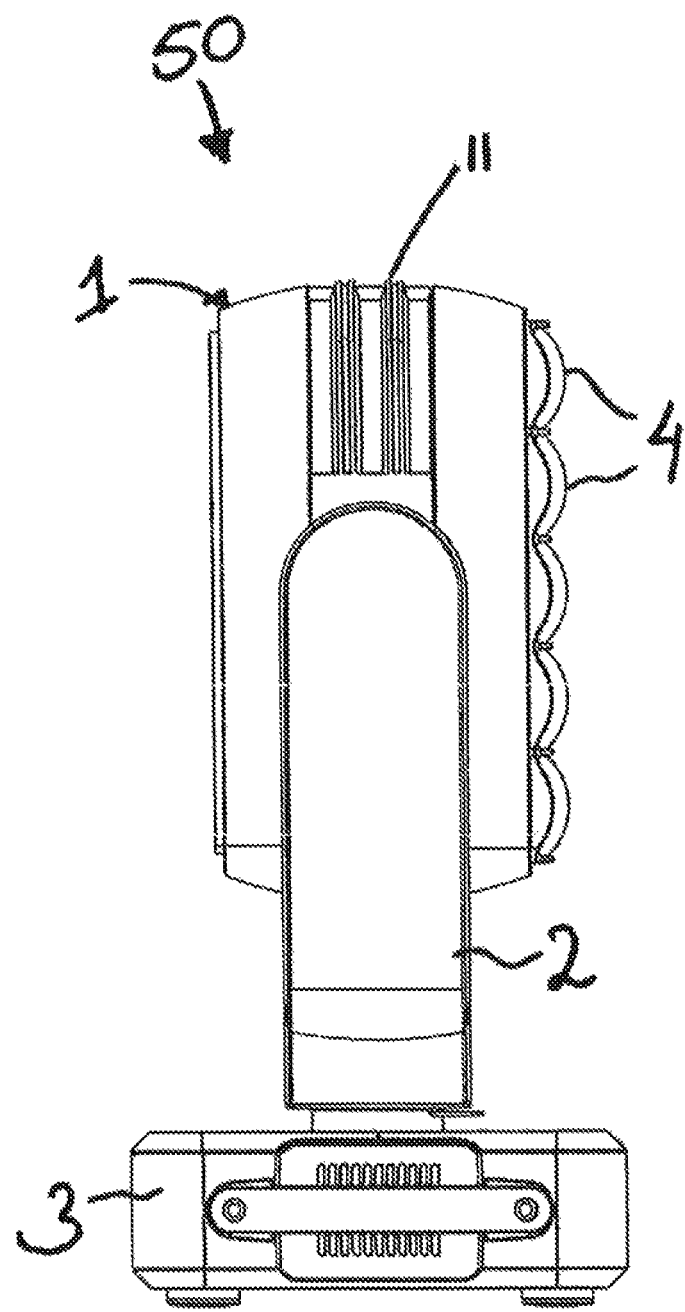
FIG. 2 shows a side view of the light device according to FIG. 1.

FIG. 2 represents a side view of the light device 50 according to FIG. 1 in which the thickness of the spotlight 1 can be distinguished, said thickness making it possible to contain the various light modules. Each light module comprises at least one light source (not shown in FIG. 2) producing a set quantity of heat. The interior of the spotlight 1 houses a cooling system (not shown) designed to cool the various light sources. The spotlight 1 is equipped with a grille 11 making it possible to generate an air flow between the interior and exterior of the spotlight 1. Said air flow thus makes it possible to cool the elements situated inside said spotlight 1 but also to exchange heat with the environment in which the light device 50 is used.

FIG. 2 shows the relatively convex shape of the lenses 4. The convex shape of the lenses 4, associated with the light sources present within the spotlight 1, makes it possible to create light beams.

Figure 3:
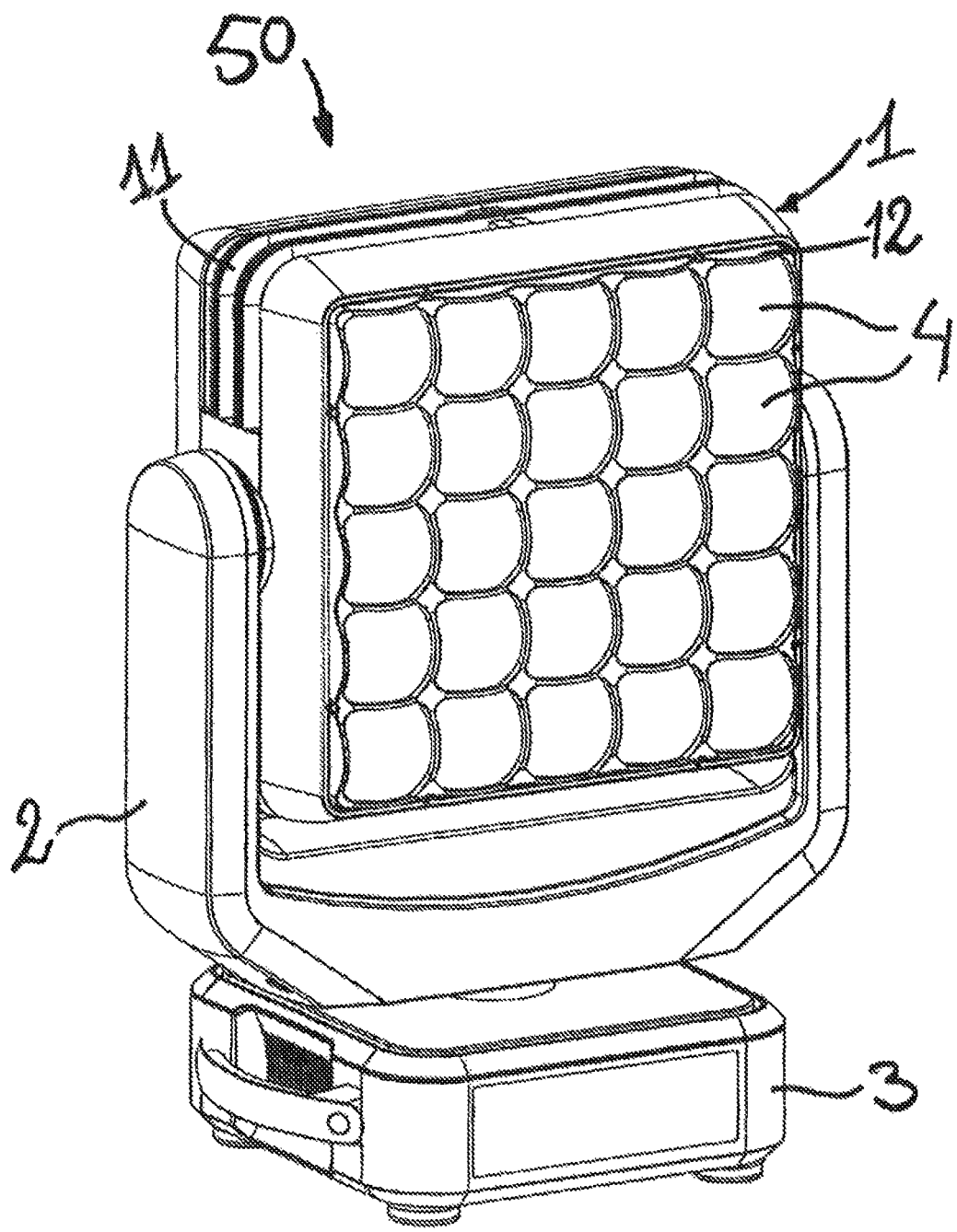
FIG. 3 represents a perspective view of the light device according to FIGS. 1 and 2.

FIG. 3 represents a perspective view of the light device 50 according to FIGS. 1 and 2. FIG. 3 shows the front face of the spotlight 1 comprising a support structure 12, making it possible to hold the various lenses 4 in a set position in relation to each other.

Figure 4:
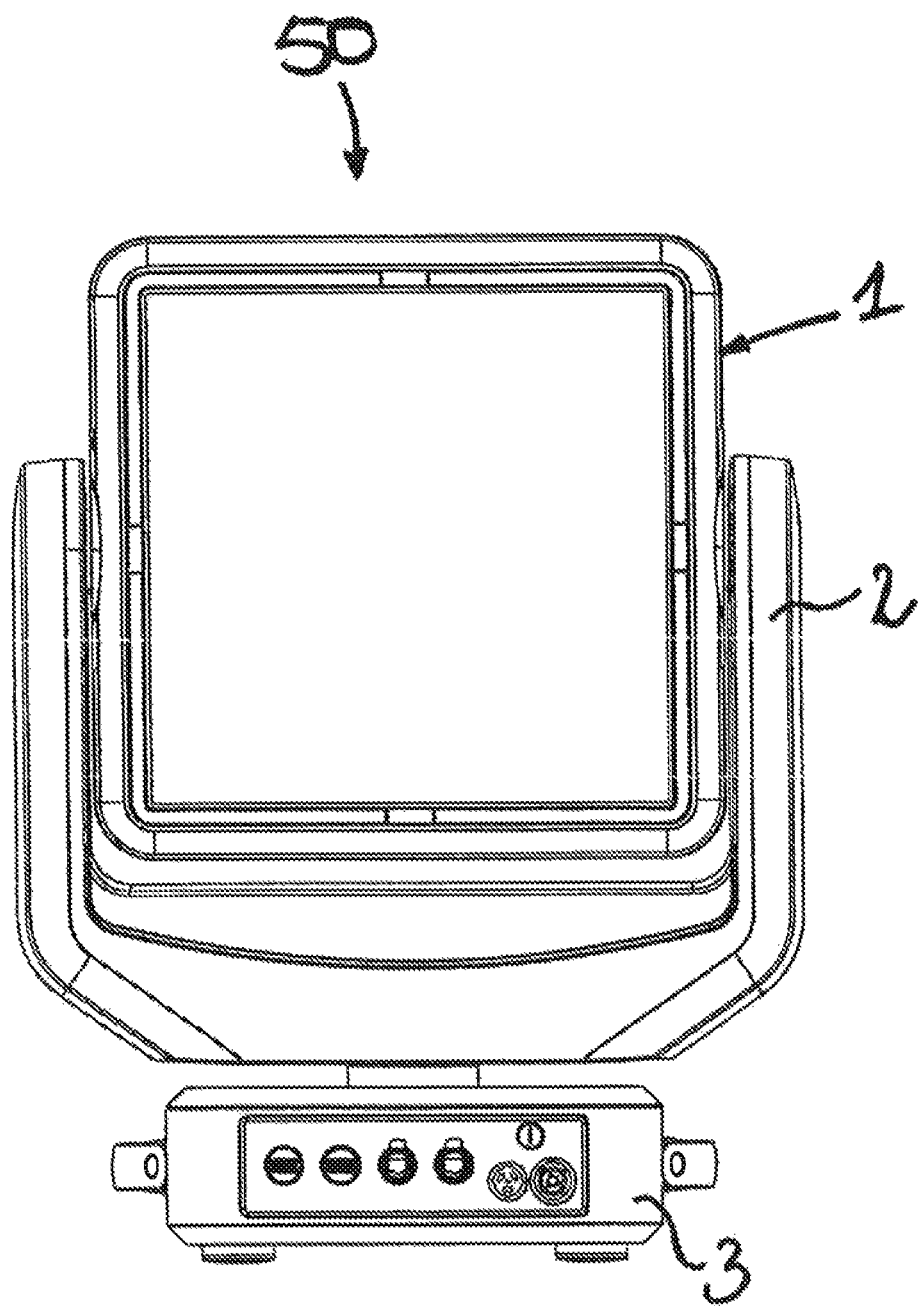
FIG. 4 shows a rear view of the light device according to FIGS. 1, 2 and 3.

FIG. 4 shows the rear face of the light device 50 according to FIGS. 1, 2 and 3. Furthermore, FIG. 4 represents the rear part of the base 3 comprising a multitude of connection means for connecting said base 3 to an electrical energy source and to a control system. The control system makes it possible to transmit control commands for a set use of said light device 50 according to the invention. The electrical energy and electrical control signals sent to the base 3 are transmitted via the bracket 2 in the direction of the various light modules present inside the spotlight 1.

Figure 5:
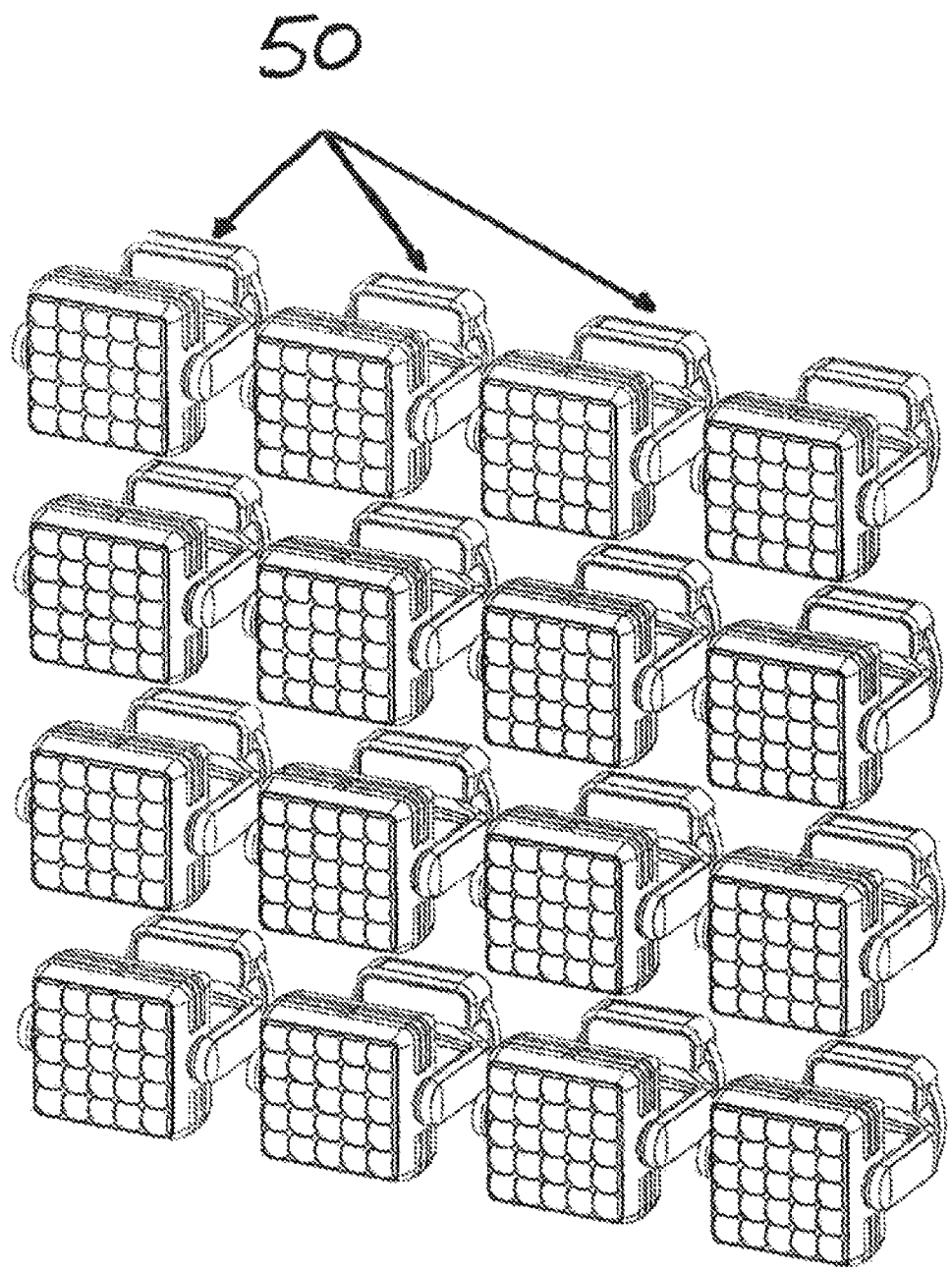
FIG. 5 represents an assembly of light devices wherein the spotlights of said light devices are positioned in parallel with each other.

FIG. 5 represents a set of light devices 50 as described in FIGS. 1 to 4, wherein the various spotlights 1 of said light devices 50 form together a surface on which images can be represented. It should be noted that, according to the invention, the various light modules of each light device 50 are adapted for receiving instructions intended for using the light sources of said light modules. Indeed, the intensity and colour of the light beam to be generated can be controlled for each of said light modules. Combined use of the light modules of the various adjacent spotlights 1 makes it possible to represent an image over the whole of the surface formed by spotlights 1 of the light devices 50. The use of said light devices 50 is represented in FIG. 6.

Figure 6:
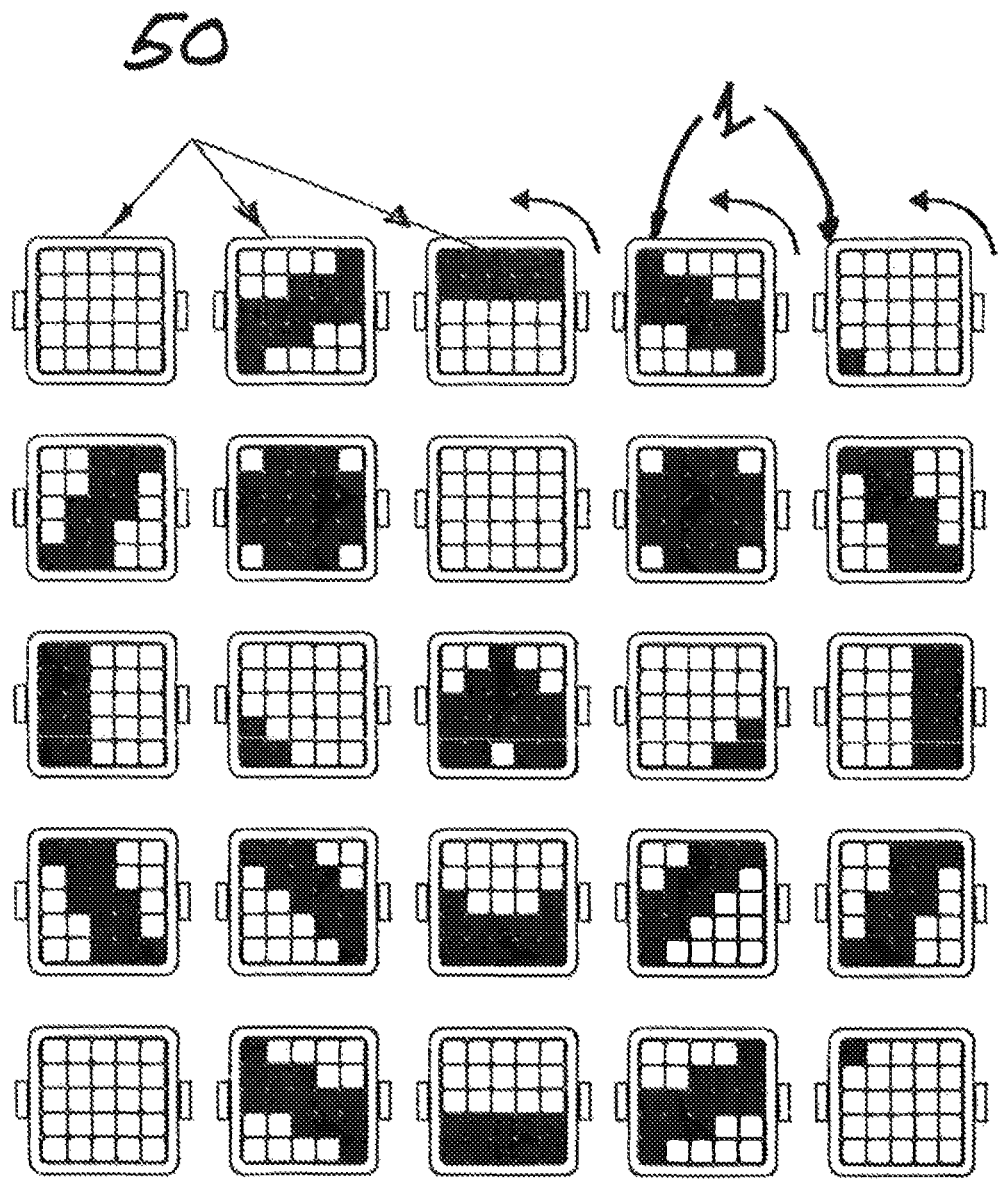
FIG. 6 shows an assembly of light devices, wherein the spotlights of said light devices are used to form together an image.

According to FIG. 6, the various spotlights 1 of the light devices 50 are positioned together so as to form a grid measuring 5×5 light devices 50. It is possible to use any other quantity of light devices 50 to form a grid thus composed of a number of horizontal rows and vertical columns.

Figure 7:
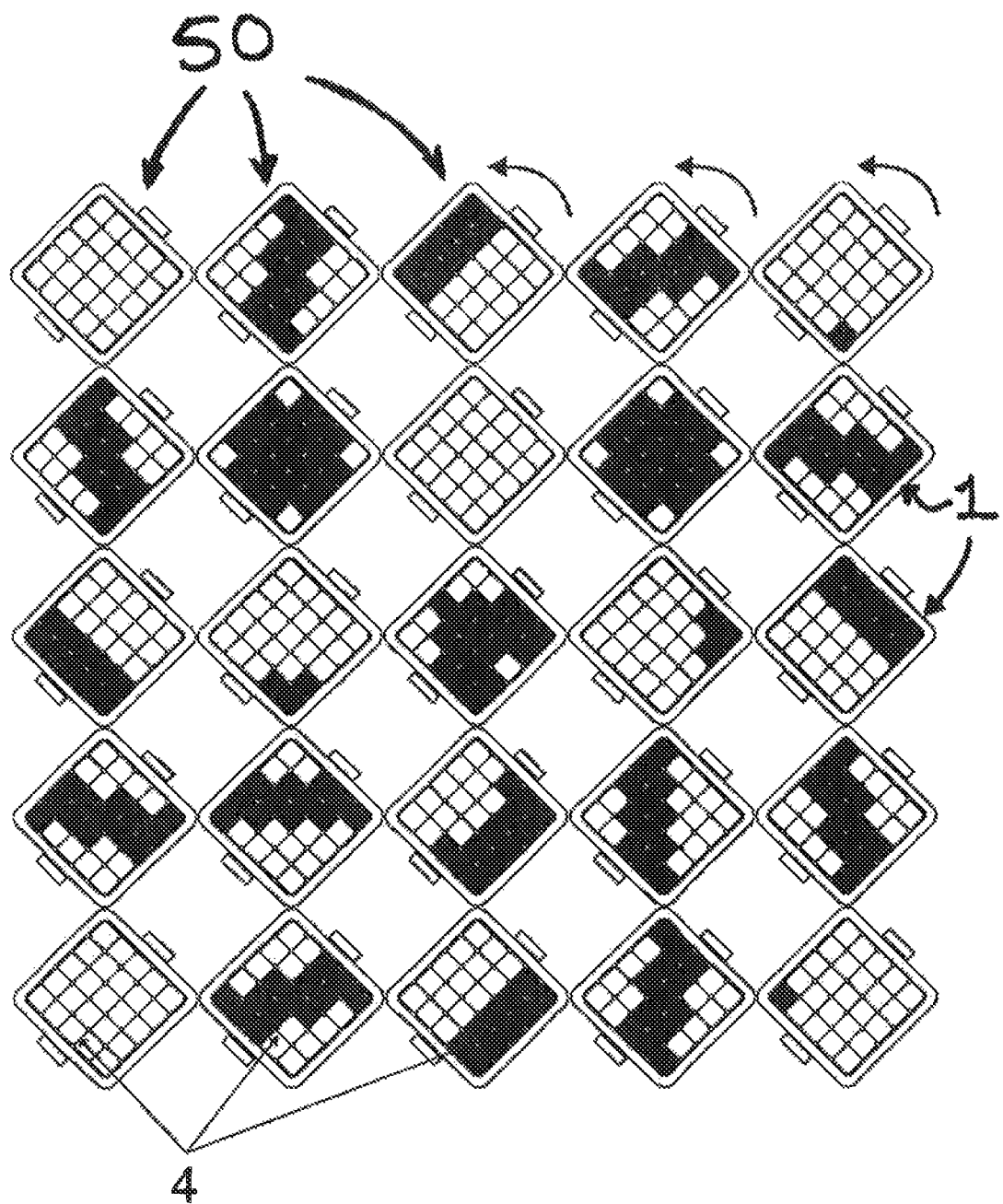
FIG. 7 represents an assembly of light devices according to FIG. 6 wherein the spotlights of said light devices are oriented in relation to each other so as to create visual effects, FIGS. 8a and 8b respectively show a perspective topside view and an underside view of an optical element according to the invention.

As stated above, the various spotlights 1 represented in FIG. 6 are rotationally mobile along the rotation axis 52. The image thus obtained with the aid of said spotlights 1 can therefore be modified. The image can be modified by selective use of one or more light modules within the various spotlights 1 of the adjacent light devices 50. Alternatively, the image can be modified by pivoting said various spotlights 1 of said light devices 50 in relation each other along the rotation axis 52, thanks to the rotary contact enabling rotation in relation to the rotation axis 52 between the bracket 2 and the base 3. The result of the rotation of the spotlights 1 in relation to each other is represented in FIG. 7. Additionally, each spotlight 1 can also pivot around the axis 51 in relation to said bracket 2 to which said spotlight 1 is connected. The combination of individual use of the various light modules in the various spotlights 1 of the light devices 50 and the possibility of pivoting the various spotlights 1 around the rotation axes 51, 52 offers the user great freedom in terms of obtaining light effects.

Figure 8A:
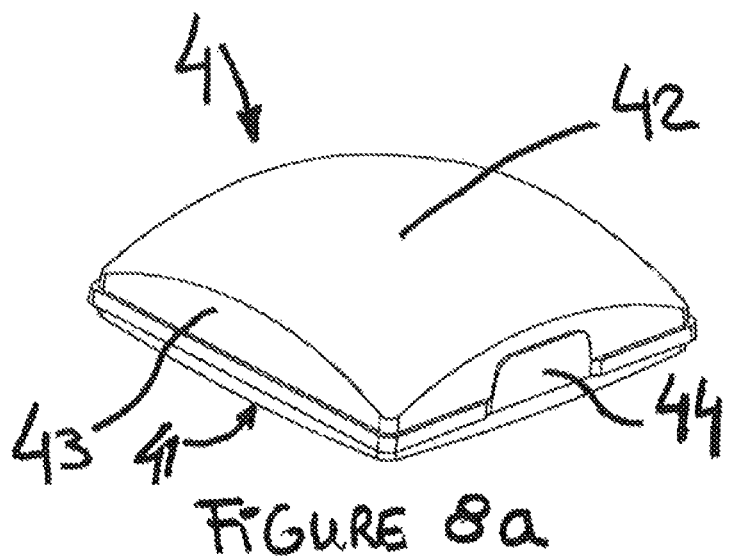
Figure 8B:
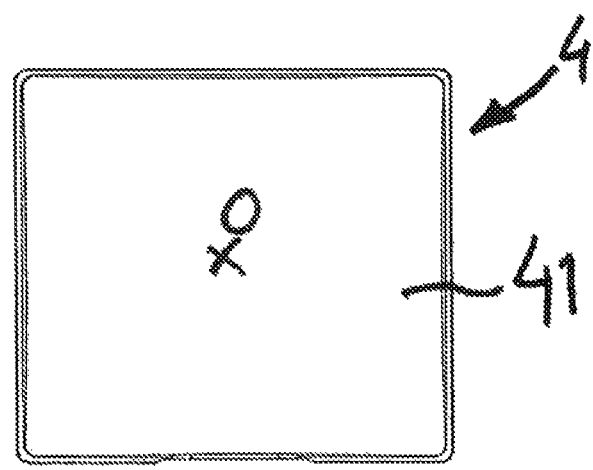

FIGS. 8*a* and 8*b* show an embodiment of lenses 4 which have an essentially square shape. FIG. 8*a* represents a perspective view of the lens 4. The lens 4 presents an essentially flat base surface 41 also shown in FIG. 8*b*. The opposite surface 42 to the base surface 41 presents a convex shape. The lens 4 comprises four sides 43 essentially perpendicular to the base surface 41 of said lens 4. According to a particular embodiment, the lens 4 is composed of plastic and is obtained, in this specific case, thanks to a moulding process. In order to enable optimal introduction of a set quantity of plastic into a mould, the lens 4 is equipped with an injection point 44.

FIG. 8*b* represents the base surface 41 of the lens 4 comprising a centre 0. During conventional use, the base surface 41 is positioned on the light source side. A detailed representation of use of the assembly composed of a lens 4 and a light source is shown in FIGS. 9, 10 and 11.

Figure 9A:
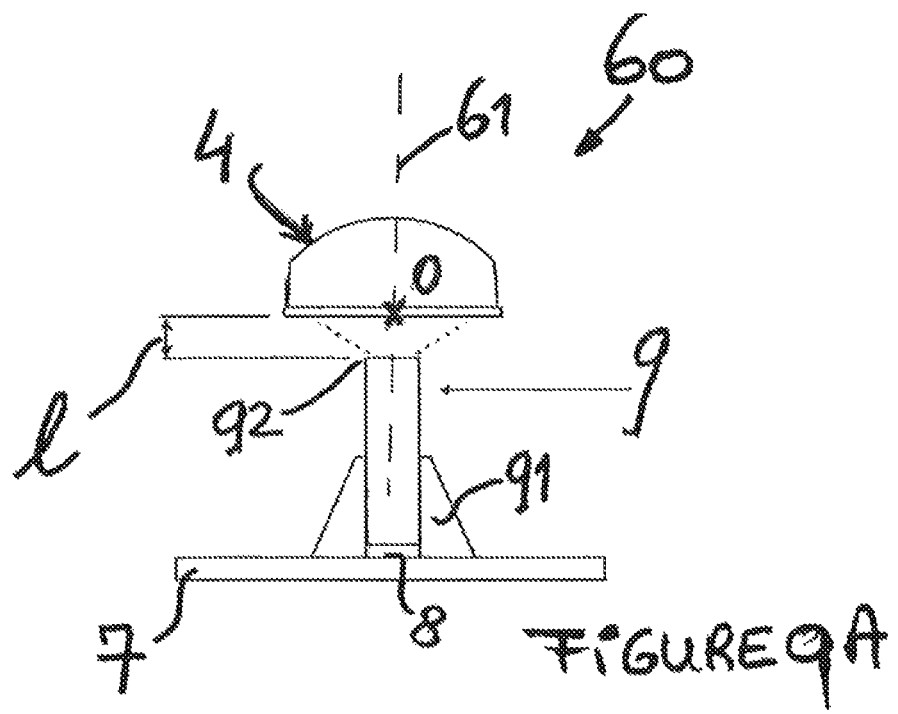
FIG. 9a shows the assembly composed of a light source and an optical element of a light module in a first relative position of the light source and of the optical element with a first distance between said light source and said optical element.

FIGS. 9*a*, 9*b*, 10*a*, 10*b*, 11*a* and 11*b* show three different modes of use of a light module 60 according to the invention. The light module 60, as represented in FIG. 9*a* comprises a printed circuit 7 such as a thermal substrate (MCPCB) on which a light source 8 is positioned, such as a light-emitting diode (LED). A light guide 9 comprising an end 92 is positioned above said light source 8, said light guide 9 having the function of guiding the light, produced by the light source 8, in the direction of the lens 4. As a general rule, said light guide 9 comprises two components. The first component forms the exterior of the light guide 9, as shown in FIG. 9, and makes it possible to give sufficient rigidity to said light guide 9. The second component (not shown), generally made with the aid of plastic, can be found inside said light guide 9. The second component presents an optical characteristic making it possible to direct the light from the light source 8 toward the lens 4 and comprises an optical axis 61. The first component of the light guide 9 comprises lugs 91 intended to position and fix said light guide 9 on the printed circuit 7.

The light source 8, the light guide 9 and the lens 4 are positioned around the optical axis 61 such that the centre of the light source 8, the optical axis 61 of the light guide 9 and the centre 0 of the lens 4 are in extension of each other. As shown in FIG. 9, the base surface 41 is situated at a distance "I" from the upper end 92 of the light guide 9. The distance "I" between the light guide 9 and the lens 4 has an influence on the exit angle of the light beam produced by the light module 60. As a general rule, it proves that the shorter the distance "I" between the light guide 9 and the lens 4, the greater the exit angle of the light beam obtained by the light module.

In the example shown in FIG. 9*a*, the distance "I" between the upper end 92 and the base surface 41 of the lens 4 is between approximately 2 and 5 mm inclusive. The use of a distance in this order of magnitude makes it possible to generate a light beam presenting an exit angle greater than 40° in relation to the optical axis 61. Such an angular amplitude offers a configuration in which the spotlight 1 is generally intended to display colours and images.

According to the configuration represented in FIG. 9*a*, the light obtained using the light module 60 has rather a decorative function. In the technical field, the type of light used with the mode of use as shown in FIG. 9a is referred to using the term "washlight".

Figure 9B:
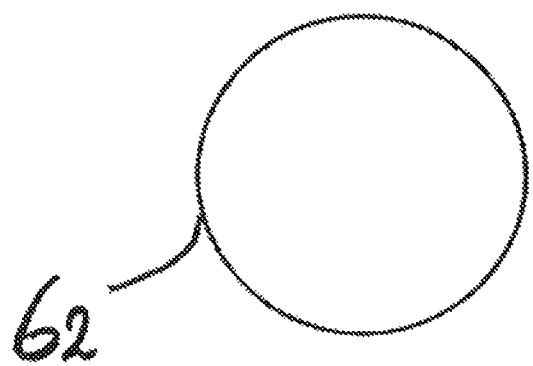
FIG. 9b shows a cross-sectional view of the shape of the light beam produced by the light module according to FIG. 9a, FIG. 10a shows the assembly composed of a light source and an optical element of a light module in a second relative position of the light source and of the optical element, with a second distance between said light source and said optical element greater than the first distance shown in FIG. 9a, FIG. 10b shows a cross-sectional view of the shape of the light beam produced by the light module according to FIG. 10a, FIG. 11a shows the assembly composed of a light source and an optical element of a light module in a third relative position of the light source and of the optical element, with a third distance between said light source and said optical element greater than the second distance shown in FIG. 10a, FIG. 11b shows a cross-sectional view of the shape of the light beam produced by the light module according to FIG. 11a, FIG. 12 represents a schematic view of the inside of the spotlight making it possible to show the option according to which it is possible to adjust the distance between the light sources and the optical elements of the spotlight light modules.

In FIG. 9b, a circle 62 represents, schematically, a cross-sectional view of the shape of the light beam 20 obtained with the aid of the light module 60 according to the configuration shown in FIG. 9a. A circle-shaped light beam 20 is obtained thanks to the distance "I" and to the shape of the lens 4, said light beam comprising, as indicated above, an exit angle greater than 40° in relation to the optical axis 61.

Figure 10A:
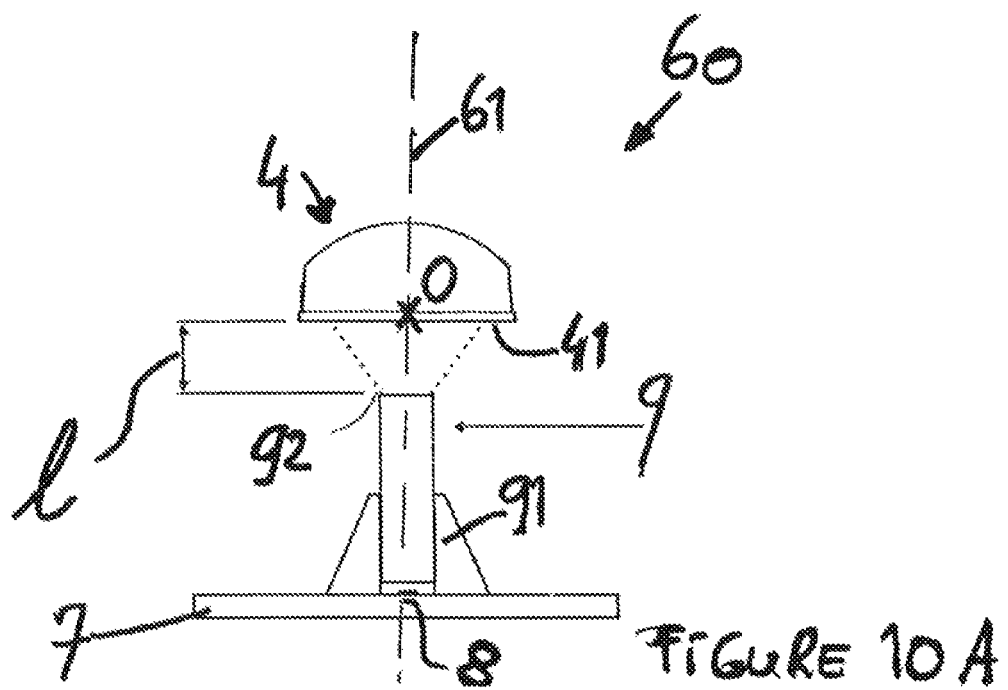

FIG. 10a shows a light module 60, represented according to a second mode of use. According to FIG. 10a, the distance "I" between the upper end 92 of the light guide 9 and the base surface 41 of the lens 4 is between approximately 5 and 25 mm inclusive. Hence, the distance "I" between said upper end 92 and said base surface 41 according to the embodiment represented in FIG. 10a is greater than that of the mode of use represented in FIG. 9a. Thus, the light beam obtained comprises an exit angle less than the exit angle obtained according to the mode of use represented in FIG. 9a.

Figure 10B:
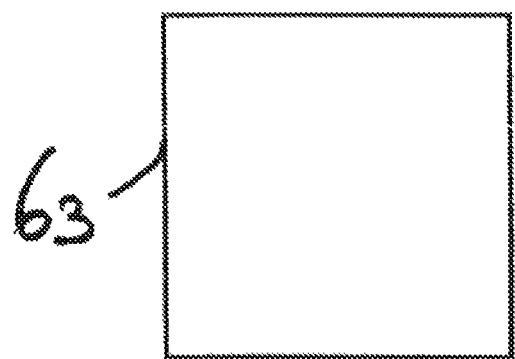

In FIG. 10b, a square 63 represents, schematically, a cross-sectional view of the shape of the light beam 20 obtained according to the mode of use in FIG. 10a. In this embodiment, the essentially square shape of the lens 4 has an impact on the shape of the light beam. Indeed, the light beam obtained also presents an essentially square shape and an exit angle between 10° and 40° inclusive in relation to the optical axis 61, as a function of the distance "I" between the light guide 9 and said lens 4.

Figure 11A:
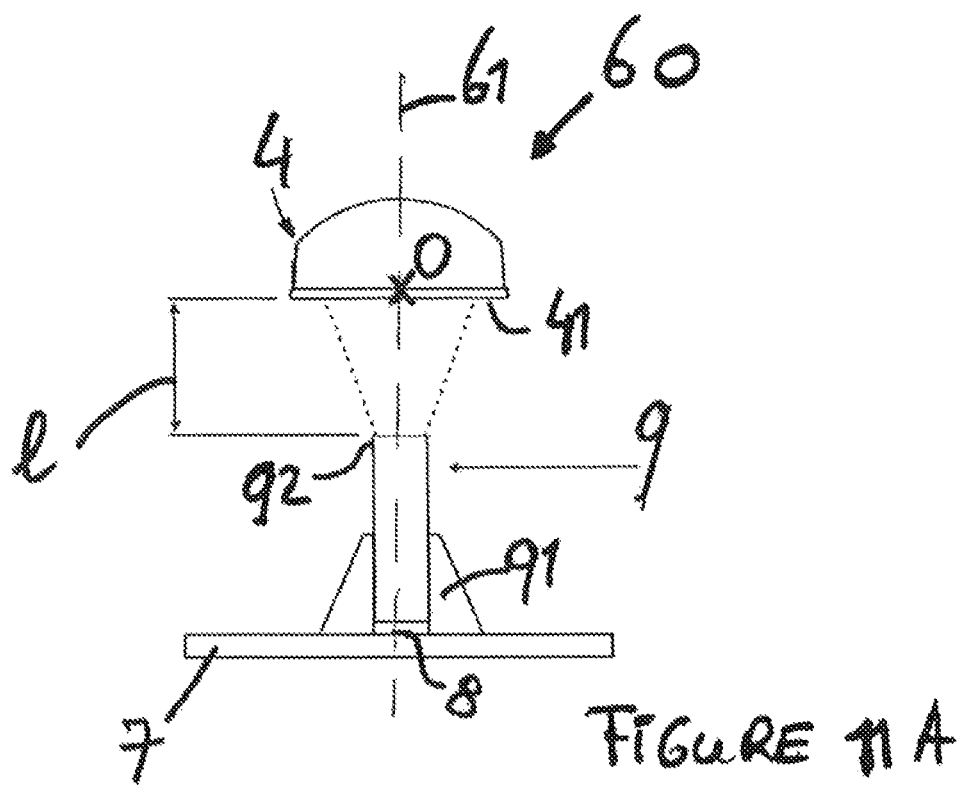

FIG. 11a represents a third mode of use of the light module 60. According to FIG. 11a, the distance "I" between the upper end 92 of the light guide 90 and the base surface 41 of the lens 4 is between approximately 25 and 40 mm inclusive. Thus, the distance "I" according to the third embodiment is greater than that of the embodiment shown in FIG. 10a. The objective of using a relatively large distance "I" between the light guide 9 and the lens 4 consists in obtaining a light beam 20 having a relatively restricted exit angle in relation to the optical axis 61. The light module 60, according to the mode of use represented in FIG. 11a, can produce, within the environment in which the spotlight 1 is situated, light beams used as "light sticks" which can move over a relatively long distance.

Figure 11B:

In FIG. 11b, a circle 64 represents, schematically, a cross-sectional view of the shape of the light beam 20 obtained according to the mode of use in FIG. 11a. In the example according to FIG. 11b, a light beam having an exit angle of between 3.5° and 10° can be obtained.

The light beams 20 from the light device 50, obtained according to the embodiments represented in FIGS. 11a and 11b, are clearly visible in the environment where said light device 50 is used, thanks to a "mist" type smoke. Said light beams 20 are rendered visible in a similar way to "light sticks" and give the impression of forming "light bodies" present in three dimensions in space. The presence of the "light sticks" combined with the possibility of pivoting the spotlight 1 thanks to the rotation axes 51, 52, enables the user to obtain spectacular light effects.

Figure 12:
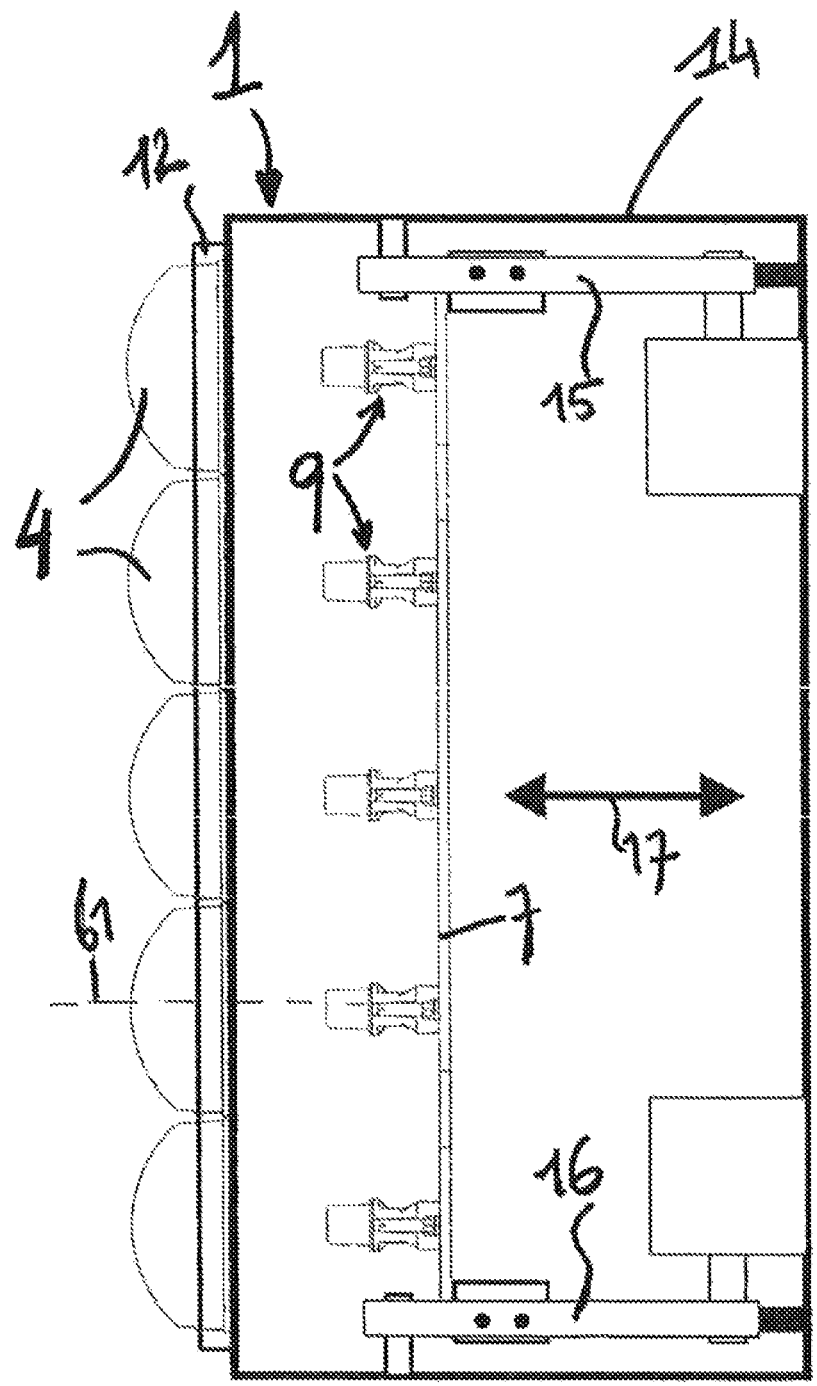

FIG. 12 represents a schematic view of the interior of the spotlight 1 for a light device 50 as represented in FIGS. 1 to 7. The spotlight 1 according to FIG. 12 comprises means described below and enabling the light module of said spotlight 1 to operate according to the operating modes represented in FIGS. 9a, 10a and 11a.

As shown in FIG. 12, the spotlight 1 comprises an exterior wall 14 and a support element 12, present on the front face of said spotlight 1, said support element 12 being intended to hold multiple lenses 4. Five lenses 4 are represented in FIG. 12. A printed circuit 7, present inside the spotlight 1, comprises light guides 9. Five light guides 9 are visible in FIG. 12, each of them positioned so as to cooperate, respectively, with a lens 4. Twenty-five light guides 9 are installed on the printed circuit 7, inside the spotlight 1, and cooperate with an equal quantity of lenses 4 present on the front face of the spotlight 1. The assembly of light guides 9, positioned on the printed circuit 7, is visible in FIG. 15.

It should be noted that, for reasons of clarity and comprehension, several elements of the interior of the spotlight 1 are not represented in FIG. 12. By way of example, the spotlight 1 comprises a cooling system (not represented) making it possible to dissipate the heat produced by the various light sources.

Figure 13:
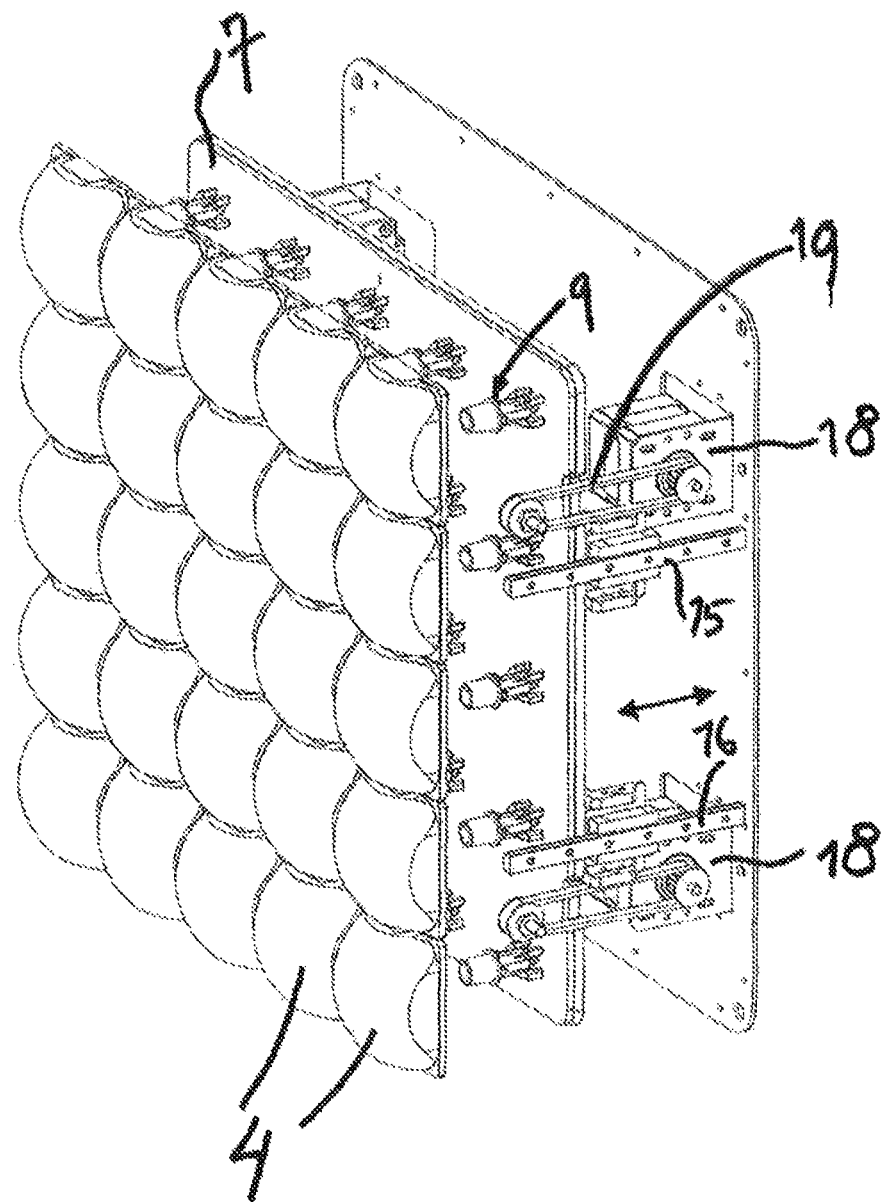
FIG. 13 shows a detailed view of the mechanism making it possible to adjust the distance between the light sources and the optical elements of the spotlight light modules.

With the aid of adapted adjustment means, the assembly comprising the printed circuit 7 and the light guides 9 can be moved in order to position said light guides 9 at a suitable distance from the lenses 4 and to enable operation of the light modules 60, as described in FIGS. 9a, 10a and 11a. In FIG. 12, the optical axis 61 is indicated for one of the light modules. As shown in FIGS. 12 and 13, the spotlight 1 is equipped, in the interior thereof, with adjustment means comprising a first rail 15 and a second rail 16, both positioned so that the assembly composed of the printed circuit 7 and of the light guides 9 can move, on the one hand toward the lenses 4 and, on the other hand, in the opposite direction, as shown with the aid of the arrow 17 in FIG. 12. It should be noted that the first and second rails 15, 16 are positioned such that they enable movement of the assembly composed of the printed circuit 7 and the light guides 9 parallel to that of the optical axes 61 of the various light modules 60 inside the spotlight 1.

As shown in FIG. 13, the adjustment means also comprise movement mechanisms each comprising a motor 18 and a belt 19. Depending on the desired use of the spotlight 1 according to one of the modes represented in FIGS. 9a, 10a and 11a, a control signal is sent to the motors 18 in order to move the belts 19 and, thus, move the assembly composed of the printed circuit 7 and of the light guides 9 toward a chosen position, by means of the first and second rails 15, 16.

It should be noted that the assembly of the first and second rails 15, 16, the motors 18 and the belts 19 is all positioned inside the spotlight 1. Thus, the movement of the assembly composed of the printed circuit 7 and of the light guides 9, in relation to the lenses 4, is not visible outside of the spotlight 1. The technical effect of the above lies in the fact that the user can use the light module 60 by alternating between the embodiments according to FIGS. 9a, 10a and 11a without modifying the exterior appearance of the spotlight 1. Thus, for the spectator, the change in mode of use of the light module 60 takes place imperceptibly insofar as the spotlight 1 does not undergo any external modification.

Figure 14:
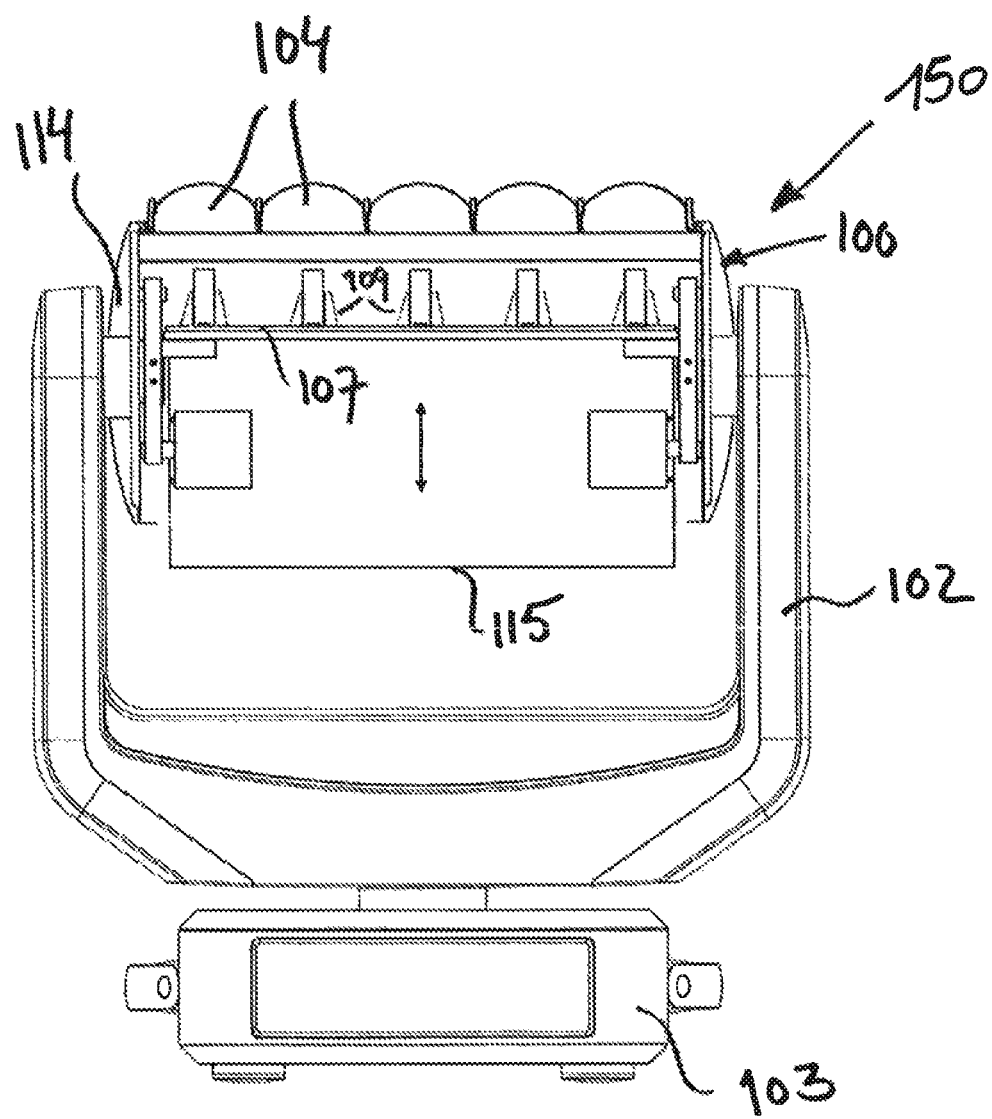
FIG. 14 represents a second embodiment of the light device according to the invention, and a schematic cross-sectional view of the spotlight making it possible to view the possibility of modifying the distance between the light sources and the optical elements of the spotlight light modules.

FIG. 14 shows a second embodiment of a light device 150 comprising a spotlight 100, fixed to a bracket 102, according to which said spotlight 100 presents a first exterior part 114 and a second exterior part 115. Lenses 104 are fixed on the first exterior part 114 and the assembly composed of a printed circuit 107 and light guides 109 is fixed on the second exterior part 115, on the exterior of the spotlight 100.

According to the embodiment represented in FIG. 14, the distance "I" between the light guide 109 and the lenses 104 of the light modules inside the spotlight 100 can be defined by a movement of the second exterior part 115 of the spotlight 100 in relation to the first part 114 of said spotlight 100. As indicated in FIG. 14, the first exterior part 114 of the spotlight 100 is equipped with connection means for connecting said spotlight 100 to the bracket 102.

Figure 15:
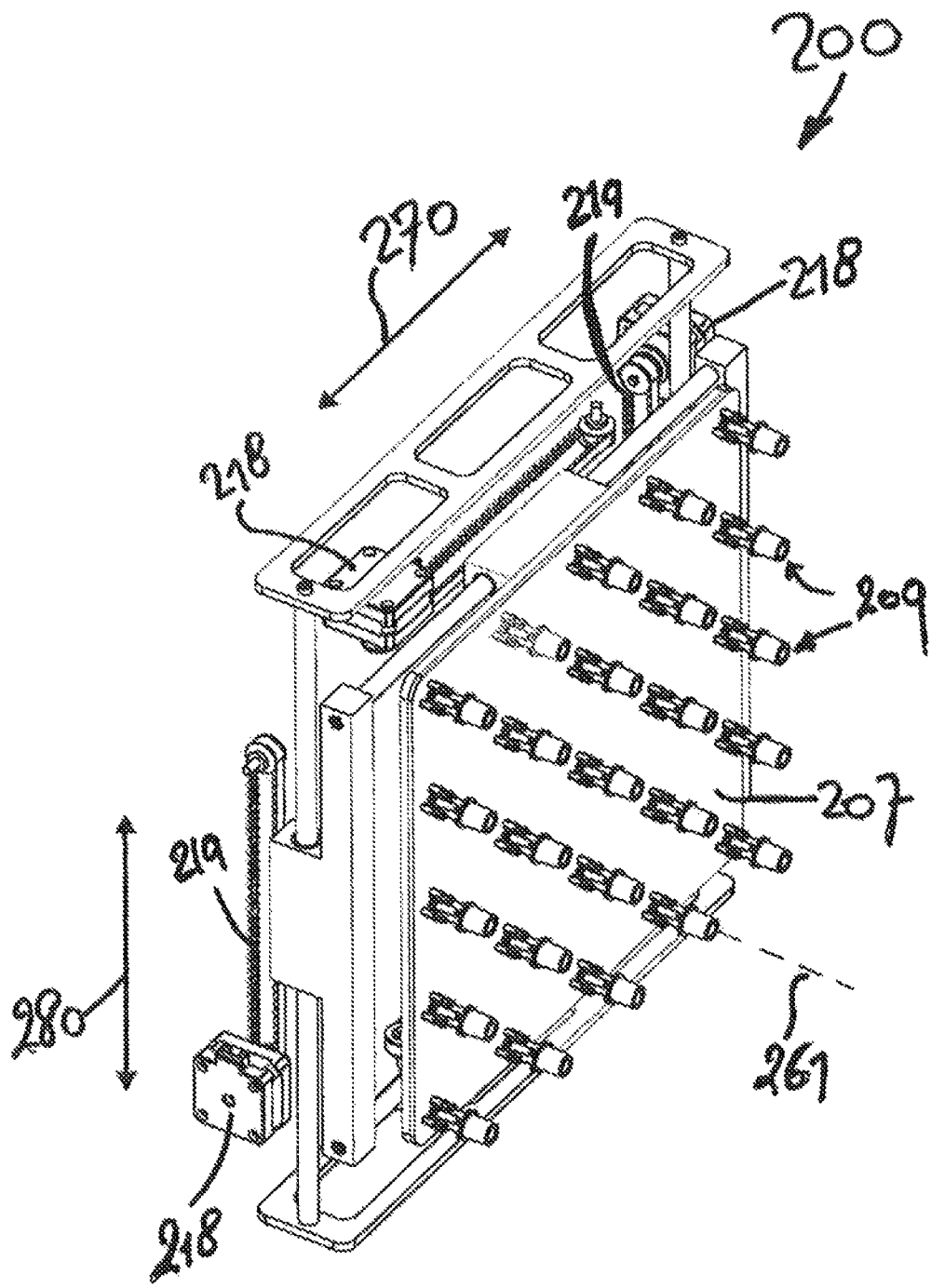
FIG. 15 represents, schematically, the possibility of adjusting the position of the light sources perpendicular to the optical axis of the light modules.
Figure 16:
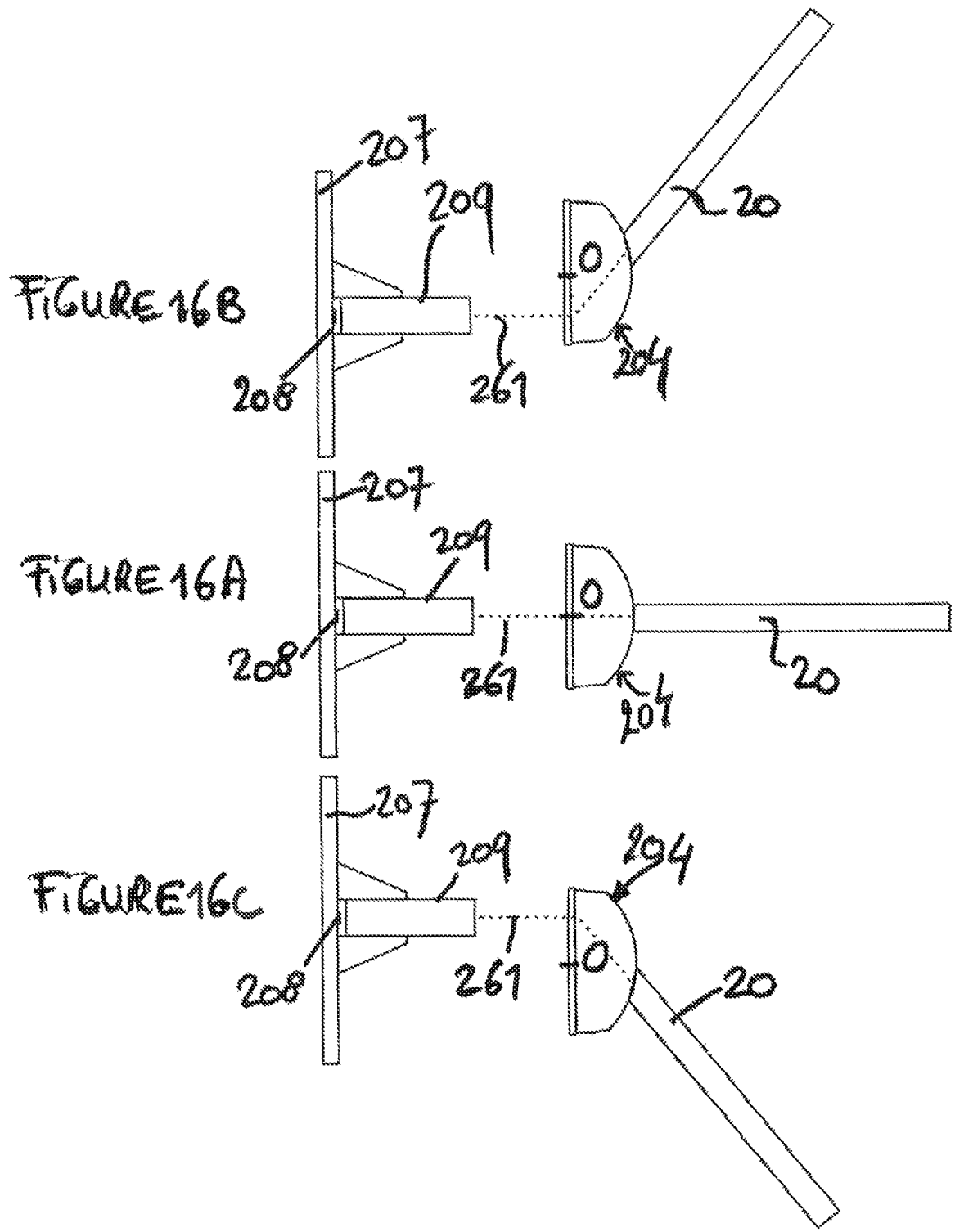
FIGS. 16a, 16b and 16c show, schematically, the possibility of modifying the position of the light sources in relation to the optical elements, the technical effect for the light beam created in this way as well as the exit direction of said light beam in relation to said optical axis.

FIG. 15 represents a schematic view of the inside of a spotlight 200 according to a second embodiment. FIG. 15 also shows a printed circuit 207 on which twenty-five light guides 209 are positioned. Each light guide 209 is adapted for cooperating with a lens (not shown in FIG. 15) present on the front face of the spotlight 200. Each light guide 209 comprises an optical axis 261. The optical axis 261, for one of the light guides 209, is represented in FIG. 15. In an initial position, the assembly composed of the printed circuit 207 and the light guides 209 is positioned so that each light guide 209 and each respective lens 204 are centred around each optical axis 261.

According to the embodiment represented in FIG. 15, the assembly composed of the printed circuit 207 and of the light guides 209 can be moved in a first direction 270 essentially perpendicular in relation to that of the optical axes 261 of the various light modules of the spotlight 200 and in a second direction 280, perpendicular to the first direction 270 and to that of the optical axes 261 of the light modules of said spotlight 200.

To enable the movement in each of the directions above 270, 280, an adjustment means composed of a first motor 218 and of a belt 219 is used respectively for movement in each of directions 270 and 280. FIG. 15 shows three adjustment means comprising three motors 218 and three belts 219. Another adjustment means composed of a motor 218 and of a belt 219 can be found behind the printed circuit 207 and, hence, is not visible in FIG. 15.

The light guides 209 can be moved in relation to the lenses (not shown in FIG. 15) in three directions, thanks to the adjustment means as represented in FIG. 13. The first direction is a direction parallel to that of the optical axes 261, the other two directions 270 and 280 being perpendicular to each other. The technical effect of the option consisting in moving the assembly composed of the printed circuit 207 and the light guides 209 in relation to the lenses 204 is represented in detail with reference to FIGS. 16a, 16b, 16c and 17.

Thus, FIGS. 16a, 16b and 16c show the lens 204, in three different positions in relation to the optical axis 261, thus the movement of the light source 208 in direction 270 with the aid of the adjustment means as represented in FIG. 15. By moving the light source 208 in relation to the centre 0 of the lens 204, the exit direction of the light beam 20 obtained with the assembly composed of the light source 208, the light guide 209 and the lens 204, can be modified.

FIG. 16a represents a mode of use where the centre of the lens 204 is situated on the optical axis 261. This means that the light beam 20 thus obtained offers an exit direction in the extension of said optical axis 261. By moving the light source 208, the exit direction of the light beam 20 thus obtained can be modified.

FIG. 16b represents a mode of use wherein the light source 208 is moved into a lower position or lower than that shown in FIG. 16a. Thus, the centre 0 of the lens 204 is situated above the optical axis 261. This movement makes it possible to obtain a light beam 20 which shifts from the optical axis 261 by a set angle and in a first direction.

FIG. 16c represents a mode of use wherein the light source 208 is moved to an upper position or higher than that shown in FIG. 16a. Thus, the centre 0 of the lens 204 is situated below the optical axis 261. This movement makes it possible to obtain a light beam 20 which shifts from the optical axis 261 by a set angle and in a second direction.

Figure 17:
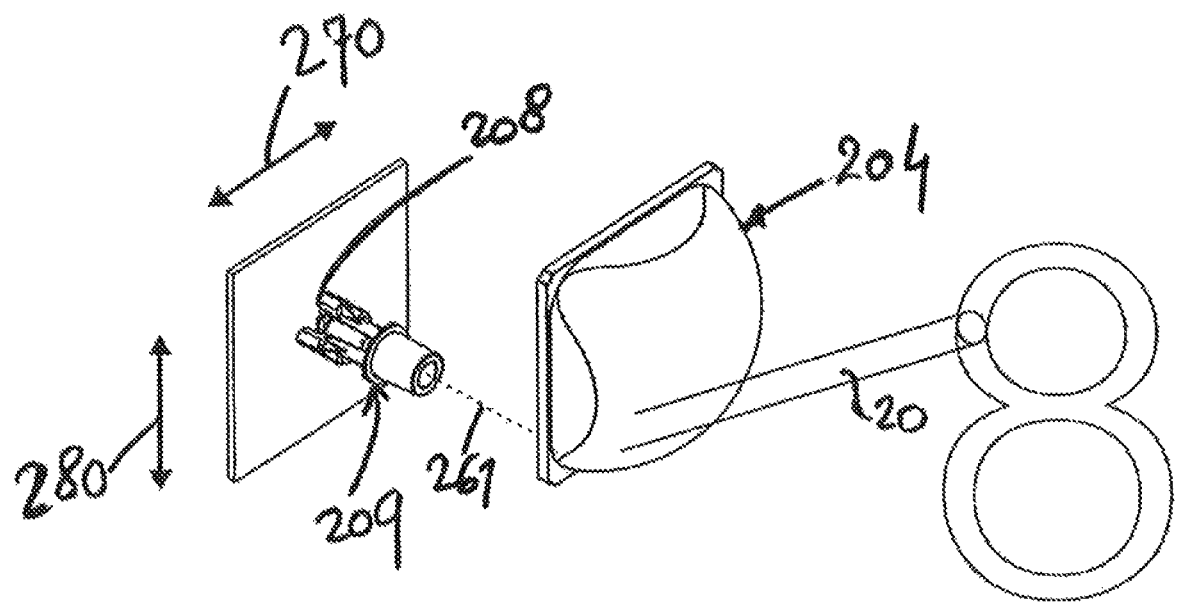
FIG. 17 represents, schematically, the possibility of creating a light beam comprising a variable angle between the optical axis of a light module and the direction of said light beam produced.

FIGS. 16a, 16b and 16c show the movement of the light source 208 in a 2D plane. With reference to FIG. 15, it should be noted that the movement of the assembly composed of the light source 208 and of the light guide 209 in relation to the lens 204 can also take place in two directions. The effect of this movement in two other directions is represented schematically in FIG. 17. As soon as the position of the assembly composed of the light source 208 and the light guide 209 in relation to the lenses 204 changes in directions 270, 280, as shown in FIG. 17, the light beam 20 shifts from the optical axis 261 according to a set angle. The technical effect makes it possible in particular to obtain a light beam 20 which can represent an "8"-shaped figure as shown in FIG. 17.

It should be noted that FIG. 17 represents an example of multiple possible modes of use.

Thus, advantageously, within the present invention, the adjustment means make it possible to modify or adjust the relative position of the light source and the optical element. This means that the position of the light source can be modified in relation to the position of the optical element and, conversely, the position of the optical element can also be modified in relation to the position of the light source.

The invention claimed is:

1. A spotlight (1, 100, 200) adapted for a light device (50, 150), said spotlight (1, 100, 200) comprising a support and at least one light module (60) adapted for producing a light beam (20) and comprising at least one light source (8, 208), comprising a light-emitting diode (LED) and an optical element (4, 104, 204), comprising a lens, wherein the light source (8, 208) and the optical element (4, 104, 204) are adapted for being positioned in extension of each other along an optical axis (61, 261), the spotlight (1, 100, 200) comprising adjustment means for adjusting the relative position of the light source (8, 208) and of the optical element (4, 104, 204) so as to modify the shape of the light beam, the spotlight (1, 100, 200) being characterised in that the optical element (4, 104, 204) is square-shaped, wherein the adjustment means is configured to move the light source (8, 208) linearly in a first direction perpendicular to the optical axis (61, 261) of the spotlight (1, 100, 200) and linearly in a second direction perpendicular to the first direction and to the optical axis (61, 261) of the spotlight (1, 100, 200).

2. The spotlight (1, 100, 200) according to claim 1, wherein the spotlight (1, 100, 200) comprises multiple light modules (60), said light modules (60) being positioned beside each other to form together a grid comprising at least one row and at least one column, to form together a rectangle.

3. The spotlight (1, 100, 200) according to claim 2, wherein the light modules (60) are positioned in a grid shape comprising the same number of rows and the same number of columns.

4. The spotlight (1, 100, 200) according to claim 1, wherein the adjustment means are adapted for adjusting the distance between the light source (8, 208) and the optical element (4, 104, 204) along the direction of said optical axis (61, 261).

5. The spotlight (1, 100, 200) according to claim 4, wherein the adjustment means are adapted for adjusting the distance between the light source (8, 208) and the optical element (4, 104, 204), between a first position making it possible to obtain a light beam (20) presenting an exit angle greater than 40° in relation to the optical axis (61, 261), a second position making it possible to obtain a light beam (20) presenting an exit angle of between 10 and 40° inclusive in relation to the optical axis (61, 261) and a third position making it possible to obtain a light beam (20) presenting an exit angle of between 3.5 and 10° inclusive in relation to the optical axis (61, 261).

6. The spotlight (1, 100, 200) according to claim 5, when depending on claim 2 or 3, wherein the light module (60) comprises a light guide (9, 109, 209) with the function of guiding the light produced by the light source (8, 208) along the direction of the optical element (4, 104, 204), said light guide (9, 109, 209) with distance (I) from the upper end (92) thereof in relation to the optical element (4, 104, 204), wherein distance (I) is between 2 and 5 mm inclusive, in the first position, between 5 and 25 mm inclusive in the second position, and between 25 and 40 mm inclusive.

7. The spotlight (100) according to claim 1, wherein the spotlight (100) comprises a first part (114) comprising said at least one optical element (104) and a second part (115) comprising said at least one light source, said adjustment means being adapted for adjusting the distance "I" between the first part (114) and second part (115) of the spotlight (100).

8. The spotlight (100) according to claim 7, wherein the first part (114) is adapted for, at least partially, enclosing the second part (115) and enabling said second part (115) to move inside the first part (114).

9. The spotlight (100) according to claim 8, wherein the first part (114) forms the exterior wall of the spotlight (100).

10. The spotlight (100) according to claim 9, wherein the first part (114) comprises, on the exterior thereof, connection means for connecting the spotlight (100) to a bracket (102).

11. A light device (50, 150) comprising a spotlight (1, 100, 200) according to claim 1 and a base (3) adapted for fixing said light device (50, 150) on a support surface.

12. The light device (50, 150) according to claim 11, wherein the spotlight (1, 100, 200) is connected to the base (3) along a first rotation axis (52) to enable rotation of said spotlight (1, 100, 200) in relation to the base (3, 103) around said first rotation axis (52).

13. The light device (50, 150) according to claim 12, wherein the first rotation axis (52) is adapted to enable unlimited rotation of the spotlight (1, 100, 200) in relation to the base (3).

14. The light device (50, 150) according to claim 11, wherein the spotlight (1, 100, 200) is connected to a bracket (2, 102), said bracket (2, 102) being connected to the base (3) along the first rotation axis (52).

15. The light device (50, 150) according to claim 14, wherein the spotlight (1, 100, 200) is connected to the bracket (2, 102), along a second rotation axis (51).

16. The light device (50, 150) according to claim 15, wherein the second rotation axis (51) is adapted to enable unlimited rotation of the spotlight (1, 100, 200) in relation to the bracket (2, 102).

* * * * *